United States Patent
Swartz et al.

(10) Patent No.: US 11,485,541 B2
(45) Date of Patent: Nov. 1, 2022

(54) PLASTIC PALLET FOR HOLDING SUBSTANTIALLY CYLINDRICAL KEGS

(71) Applicant: Schoeller Allibert GmbH, Schwerin (DE)

(72) Inventors: Dennis Swartz, Spring Lake, MI (US); Steve Loftus, West Midlands (GB)

(73) Assignee: Schoeller Allibert GmbH, Schwerin (DE)

( * ) Notice: Subject to any disclaimer, the term of this patent is extended or adjusted under 35 U.S.C. 154(b) by 362 days.

(21) Appl. No.: 16/630,333

(22) PCT Filed: Sep. 28, 2017

(86) PCT No.: PCT/EP2017/074617
§ 371 (c)(1),
(2) Date: Jan. 10, 2020

(87) PCT Pub. No.: WO2019/011455
PCT Pub. Date: Jan. 17, 2019

(65) Prior Publication Data
US 2020/0172289 A1    Jun. 4, 2020

(30) Foreign Application Priority Data
Jul. 13, 2017   (DE) .................... 10 2017 115 722.0

(51) Int. Cl.
*B65D 19/44*    (2006.01)
*B65D 19/00*    (2006.01)
*B65D 71/70*    (2006.01)

(52) U.S. Cl.
CPC .......... *B65D 19/44* (2013.01); *B65D 19/0002* (2013.01); *B65D 71/70* (2013.01);
(Continued)

(58) Field of Classification Search
CPC .... B65D 19/44; B65D 19/0002; B65D 71/70; B65D 2519/00815
(Continued)

(56) References Cited

U.S. PATENT DOCUMENTS 2,444,326 A  *  6/1948  Baker ................ B65D 19/0026
                                                108/55.3
3,636,888 A      1/1972  Angelbeck, Jr.
(Continued)

FOREIGN PATENT DOCUMENTS

DE    20 2014 000 819 U1    4/2014
GB         2 013 615 A      8/1979
(Continued)

OTHER PUBLICATIONS

European Patent Office; International Search Report; dated Feb. 26, 2018.

*Primary Examiner* — Rafael A Ortiz
(74) *Attorney, Agent, or Firm* — Price Heneveld LLP (57) ABSTRACT

In the case of a pallet made of plastic for holding substantially cylindrical kegs with a pallet support surface for the keg holder, which comprises upwardly protruding supporting projections for supporting the kegs placed on the support surface, the supporting projections are configured and arranged on the support surface such that kegs with different keg diameter sizes can be supported by these supporting projections.

19 Claims, 5 Drawing Sheets

(52) U.S. Cl.
CPC .............. *B65D 2519/00034* (2013.01); *B65D 2519/00268* (2013.01); *B65D 2519/00815* (2013.01); *B65D 2519/00965* (2013.01)

(58) Field of Classification Search
USPC ........................................................ 206/386
See application file for complete search history.

(56) References Cited

U.S. PATENT DOCUMENTS

| | | | | |
|---|---|---|---|---|
| 4,838,419 | A | * | 6/1989 | Weits ..................... B65D 71/70 206/821 |
| 5,144,897 | A | * | 9/1992 | Avery .................... B65D 71/70 108/55.3 |
| 9,010,255 | B2 | | 4/2015 | Baltz |
| 2015/0001114 | A1 | * | 1/2015 | Kelly ................. B65D 19/0038 206/386 |
| 2018/0290805 | A1 | * | 10/2018 | Koefelda ........... B65D 71/0088 |

FOREIGN PATENT DOCUMENTS

| | | |
|---|---|---|
| GB | 2 322 849 A | 9/1998 |
| GB | 2 416 530 A | 2/2006 |

\* cited by examiner

PLASTIC PALLET FOR HOLDING SUBSTANTIALLY CYLINDRICAL KEGS

BACKGROUND OF THE INVENTION

The invention relates to a pallet made of plastic for holding substantially cylindrical kegs with a pallet support surface for the keg holder that includes upwardly protruding supporting projections for supporting the kegs placed onto the support surface.

The English term "keg" which has meanwhile become part of the vernacular in the beverage industry in Germany refers to reusable containers having a substantially cylindrical shape, which have been developed and used specifically for industrial filling and germ-free storage of beverages. In the meantime, these keg containers have become widely used in the catering trade and the term keg has now also been used for any container sizes and container systems. In this case, typical keg sizes are kegs having a capacity of 30 L and 50 L but in the beverage industry kegs having different filling capacities are also used. In this case, kegs commonly have a filling capacity of ⅙ barrel, ¼ barrel, ½ barrel (typical US size) as well as 20 L, 30 L and 50 L.

Mostly, these cylindrical kegs are produced from stainless steel and they are provided centrally on the top side with a valve, the so-called keg head, to which a fitting tap head can be attached for use. It is now impossible to imagine that these kegs have not always been used in the beverage sector.

These kegs are transported on pallets which, for handling reasons, are typically designed in the size range between 100 and 130 cm in terms of length and width. A common pallet size is 45×48 inches, corresponding to a length×width of 114.30×121.92 cm.

Although there are still no internationally bindingly established standards for keg sizes, typical diameter sizes range from 210 to 400 mm, wherein the heights vary depending upon the filling capacity of the kegs and in practical terms range between 460 and 600 mm, which is governed solely by the ability to handle these kegs after they have been filled. Frequent keg diameters are 235, 278 and 395 mm at heights of 532, 570, 590 and 595 mm without being limiting.

For logistics purposes, this means that various pallets must be used with regard to storage and transport, said pallets each being tailored to specific keg sizes because these kegs are supported on the pallets by means of strip-like support means which form therebetween keg holders for placing the kegs.

Of course, this is associated with logistical outlay. An example of this are the systems described in U.S. Pat. No. 9,010,255 B2, comprising pallets which have elevations which engage into the interior of the base of the kegs and in particular into annular skirts which are formed therein, protrude upwards and downwards from the containers and have beads which are flanged at their free ends. Furthermore, the placed kegs which are placed down on the circular elevations are supported externally by elevated projections. These systems of pallets and kegs arranged thereon are stackable. Further corresponding pallets for such stacking arrangements are described in GB 2 416 530 A and DE 20 2014 000 819 U1. Moreover, in order to transport the kegs it is known to use intermediate layers which, for stacking purposes, have base-side projections which engage into an upper end of a keg and have cut-outs on the opposite pallet side or intermediate storage area on the top deck for the purpose of placing such kegs.

The object of the invention is to provide pallets for transporting and storing kegs which, with a simple structure, considerably reduce the outlay required for the transportation and logistics of different kegs and permit stable storage of a plurality of pallets loaded with kegs.

SUMMARY OF THE INVENTION

In accordance with the invention, pallets made of plastic are provided for holding substantially cylindrical kegs which, for the keg holder and for the support of the kegs on the support surface, have upwardly protruding supporting projections which are arranged and formed on the support surface such that, with a single pallet, kegs having different keg diameter sizes can be supported and held on the pallet. That means that the design of the pallet is so universal that kegs having different keg diameters can be held and supported.

In an expedient embodiment, the supporting projections are arranged and formed on the pallet such that kegs having three different keg diameter sizes can optionally be supported on the support surface of such a pallet. In this case, consideration is given to the circumstance that in the case of conventional systems in the beverage industry it is standard to use kegs having three differing container diameters, but frequently with different heights in order to provide containers with different filling capacities.

In this case, it is expedient that the supporting projections form keg holders for placing kegs having different, preferably three different, keg diameter sizes on a single pallet, whereby in practice, with different keg heights, kegs having filling capacities of e.g. ⅙ barrel, ¼ barrel, ½ barrel, 20 L, 30 L and 50 L can be produced. This means that e.g. six different keg sizes can be transported using a single pallet, which naturally reduces the logistical outlay for transportation and storage and also the production costs accordingly.

For this purpose, it is expedient that the keg holders formed by the supporting projections provide on a single pallet a grouping for holding kegs having the largest keg diameter, which is achieved preferably by three rows of keg holders arranged next to one another and in parallel with one another, wherein the middle row comprises two keg holders and the two outer rows of this grouping each comprise three keg holders arranged one after the other.

Furthermore, however, the same pallet also has keg holders in a further grouping, namely for keg holders for holding kegs having a medium keg diameter size, wherein the keg holders are expediently aligned in four rows arranged next to and in parallel with one another, wherein in the case of this grouping, the two middle rows each have three keg holders and the two outer rows each have four keg holders disposed one after the other.

Furthermore, the same pallet advantageously has keg holders in a third grouping, namely for holding kegs having a smallest keg diameter size, wherein in the case of this grouping of keg holders, five rows are expediently provided which are arranged next to and in parallel with one another and support the kegs, wherein in this grouping, the middle row has two keg holders, the two rows adjacent thereto each have four keg holders and the two outer rows each have five keg holders, again disposed one after the other.

In an expedient manner, three groupings of in each case differently sized keg holders are provided on a single pallet, in particular on the support surface thereof, said keg holders being adapted or tailored for supporting kegs having three different keg diameter sizes.

In an expedient manner, the rows are aligned next to one another such that the keg holders on the pallet of adjacent rows are each offset with respect to one another by a half diameter and so the keg holders and also the then placed kegs are, so to speak, aligned with the gaps of the adjacent row. Therefore, after placing the kegs into the keg holders, a very compact and space-saving arrangement of the kegs within such a system is achieved which, when stacked one on top of the other, permits the transportation of many kegs in one stack.

Although pallets having three differently sized keg holders are preferred, the invention also comprises systems having two or more than three, in particular four, differently sized keg holders.

In an expedient manner, the pallet has, in plan view, an H-shaped outline, wherein the two longitudinal limbs of the H are formed by the two outermost rows of the groupings with the largest keg diameter size and the crosspiece of the H is formed by the middle row of the grouping having the largest keg diameter size. In this case, two oppositely arranged indentations of the pallet are provided in the region of the crosspiece of the H.

For the purpose of holding the kegs held in the keg holders, it is expedient to form the supporting projections, which form or define the keg holders therebetween, by means of stump-like projections or sleeve-like projections, where this relates to first supporting projections arranged in the support surface of the pallet. Furthermore, in an expedient manner second supporting projections which are arranged on the peripheral edge can be provided for the keg holders arranged on the outer edge of the pallet, these supporting projections being formed as flange-like or web-like strips. These second flange-like supporting projections can be arranged circumferentially or else also in portions over the periphery.

In an expedient manner, the supporting projections have a height calculated from the support surface which is in the range between 1 and 6 cm, preferably 1 to 4 cm, wherein this is in no way limiting.

For the purpose of very rapid placement of the kegs into the pallets, in particular the first projections of the keg holders are formed in a manner tapering upwards. Both the first and also the second projections are designed advantageously as hollow profiles which are open in particular towards the bottom, wherein in an expedient manner the tip of the projections is formed having closed walls. In particular, with the focus on saving materials, the pallet support surface can have an open structure, wherein in an expedient manner the support surface is formed by a lattice.

In a particularly advantageous manner, the keg holders for the different groupings, i.e. the groupings having different keg diameter sizes are formed having an annular standing surface for the kegs to be held, which is formed corresponding to the standing surfaces of the kegs having the different keg diameter sizes. In an expedient manner, the kegs are supported at this location via their ring skirts. In particular, the width of the standing surfaces of the keg holders is adapted to the width of the corresponding ring skirt of the kegs to be held, but in an expedient manner can be in the range of 0.5 to 2.0 of the width of the keg ring skirts. Of course, irrespective of this the remaining, in particular lattice-like support surface can also absorb the load from the kegs accordingly. These standing surfaces on sides of the keg holder are defined within the support surface by the first supporting projections and are defined on the edge side by the second supporting projections. In a particularly advantageous manner, the annular standing surfaces are designed in the form of webs, wherein the webs are formed by circumferential web portions or, particularly expediently, are formed by means of ring webs, i.e. completely circumferential annular webs. As a result, the support surface is reinforced in the region of each keg holder and therefore the pallet is stiffened overall so that it is possible to provide stable pallets for holding kegs which are very heavy once filled.

In a further embodiment, the keg-side standing surfaces are formed by means of annularly grouped web portions or advantageously by ring webs, of which the diameter size corresponds to the different keg diameter sizes and so at a glance the pallets can be loaded very quickly with the differently formed kegs. In this regard, it is expedient to mark these annular ring portions or ring webs in a colour, and in particular with different colours depending upon the diameter of the keg holder, which permits rapid placement of the kegs during loading of the pallet This is expedient because the pallet according to the invention is designed for holding kegs having different keg diameter sizes. The corresponding colour markings serve to specify the row for each grouping accordingly for the loading procedure.

In an expedient manner, the web-like ring portions or the ring webs are formed in one piece with the pallet, in particular the support surface lattice, and stiffen same accordingly.

The first supporting projections on the support surface of the pallet are positioned in an expedient manner by virtue of the fact that the first supporting projections are each arranged in a region on the support surface which is defined by the annular standing surfaces of keg holders of in each case two of the three holder groupings. In an expedient manner, at every location where the standing surfaces of in each case the third grouping cross these first supporting projections, corresponding slots are provided in these first supporting projections in the width of the standing surfaces. As a result, the number of projections on the standing surface can be reduced whilst the kegs to be held are still supported effectively, which simplifies the production of the pallets.

Within the scope of the invention, it is expedient that two to five first supporting projections are provided for each keg holder on the support surface.

In order to support the placed kegs, it is expedient to form the side walls of the first projections, but also of the second projections, in an arcuate or rounded manner.

In an expedient manner, the first supporting projections are also grouped in such a way that the supporting projections are arranged both inside and/or outside the corresponding standing surfaces and so, depending upon the grouping, i.e. the keg size, the placed kegs can be supported partially from the inside and/or outside.

If, within the scope of the invention, the keg holders of the pallets are adapted expediently to three different keg diameter sizes, this is in no way limiting, instead the pallets can also be designed, as required, having keg holders for only two different keg diameter sizes or even more than three, in particular four, keg diameter sizes, and in particular similarly to the manner described above. However, it is expedient to adapt the pallets to three different keg size diameters for the keg holders because in practice at least three different keg diameters are generally also used for different keg systems in spite of the different filling capacities.

For space saving reasons, the pallet corners are rounded, wherein the rounding is expediently adapted to the standing surfaces or keg holders with the largest keg size diameter.

The edge progression of the pallets can be contoured accordingly, in adaptation to the keg holders provided on the edge side, and in particular taking into account the keg holders with the largest and medium keg holder diameter.

According to a further, very advantageous development of the invention, projections, in particular in the form of hollow profiles, which protrude downwards from the base side of the support surface are likewise provided on the underside of the pallets in particular positioned exactly with the first and second supporting projections. These projections which are formed expediently in a complementary manner with the supporting projections support, in the stack, the upper ends of the kegs supported on the lower pallet and so the top side of the kegs is also supported in the stack accordingly within the pallets. As a result of the hollow formation of these projections which protrude downwards, are open at the bottom and are expediently designed in the same way as the first and second supporting projections, a space saving arrangement of the pallets stacked on top of one another in the empty state is produced because the first and second supporting projections can engage into the correspondingly hollow hollow profiles on the underside of the support surface of the pallets.

Within the scope of the invention, it is expedient for the handling capability of filled pallets to design said pallets in a size range between 100 to 130×100 to 130 cm, wherein this pallet size is expedient but in no way limiting.

BRIEF DESCRIPTION OF THE DRAWINGS

Embodiments of the invention will be described hereinafter with reference to the drawing. In the drawing.

DETAILED DESCRIPTION OF THE PREFERRED EMBODIMENTS

Figure 1:
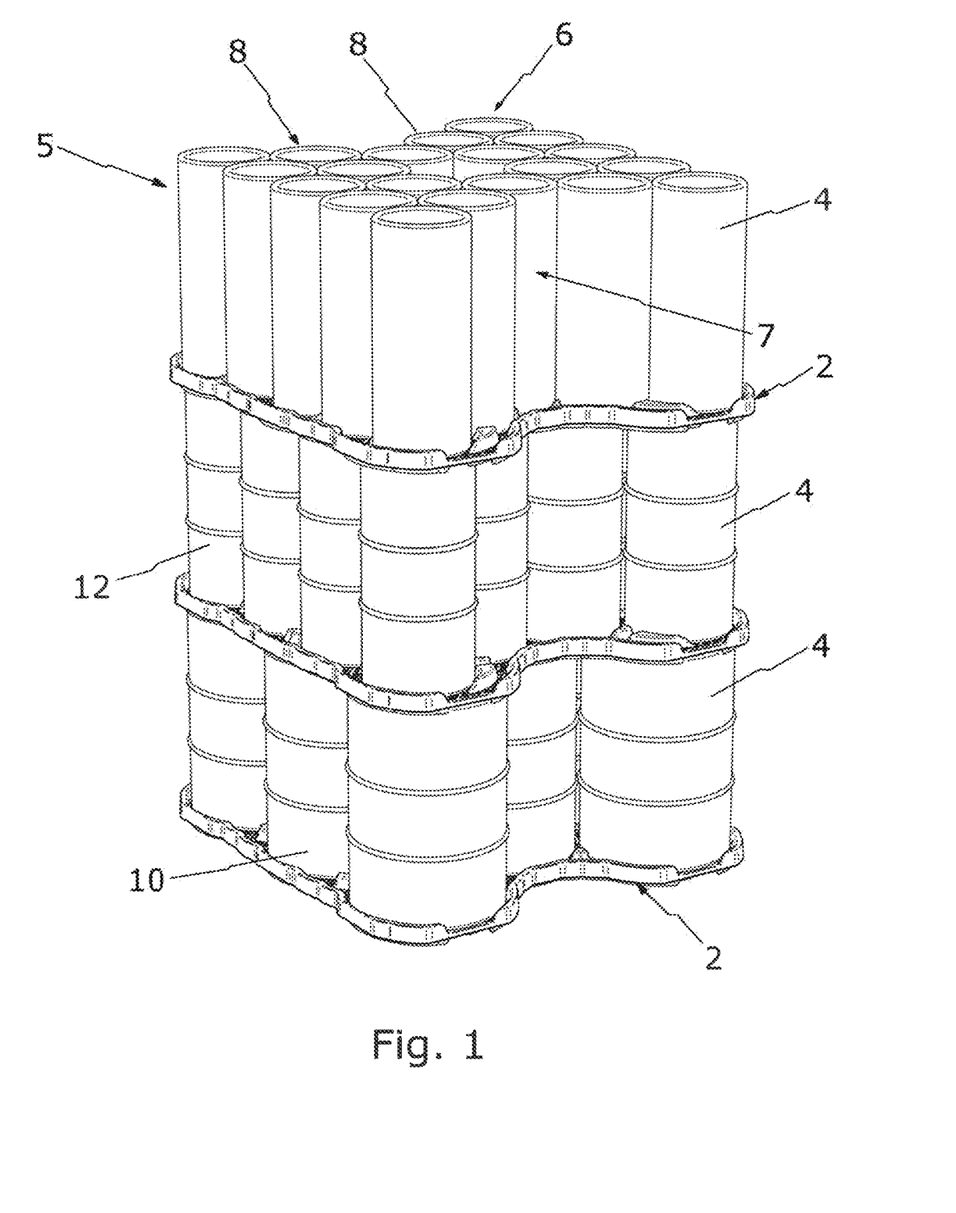
FIG. 1 shows a perspective view of a pallet stack with pallets in accordance with the invention in the use position.

FIG. 1 illustrates a stack of pallets 2 in accordance with the invention arranged on top of one another in the use position, i.e. with kegs placed down thereon. In detail, the stack in the illustrated exemplified embodiment is formed from three pallets 2 arranged on top of one another, wherein a plurality of parallel rows of kegs 4 are arranged on each pallet. It can be seen that kegs 4 each with the same keg diameter size are arranged on each pallet. In the exemplified embodiment according to FIG. 1, which is illustrated purely by way of example, twenty kegs 4 are arranged on the upper pallet 2 in five rows, specifically two outer rows 5 and 6, a middle row 7 and two rows 8 each lying between the outer and the middle rows. The rows 5 to 8 are arranged parallel to one another and the kegs of adjacent rows are offset with respect to each other, i.e. aligned with the gaps of the adjacent row, as is clear to see in FIG. 1 for the upper layer of kegs 4. This produces a highly space-saving arrangement of a large number of kegs on the pallet 2.

The lower pallet 2 supports kegs 4 with a larger keg diameter size, wherein eight kegs 4, again in offset arrangement, are held in three parallel rows. The middle pallet supports kegs 4 with a medium diameter size, wherein the kegs 4 at that location are arranged in four rows, wherein the two outermost rows each contain four kegs and the two middle rows each contain three kegs and so a total of 14 kegs are arranged on the pallet.

In accordance with the invention, a single pallet 2 is used for these kegs which each have different keg diameter sizes. In this case, the pallet 2 in accordance with the invention is fitted out in such a way that kegs with different keg diameter sizes can be held and supported as described hereinunder with the aid of an embodiment given purely by way of example.

In the illustrated exemplified embodiment, kegs of the same keg diameter size are arranged on each stack layer, which is expedient since kegs with different holding capacities can also have different heights, but again this is not necessarily so, it is rather the case that kegs with different keg diameter sizes can also be arranged on a pallet.

In order to provide a better description of the support means for different keg diameter sizes provided on the pallet 2, it is assumed hereinunder that stacking is as shown in FIG. 1 in which kegs of the same size are arranged on each pallet. In this respect, FIG. 1 shows a system of pallets with kegs placed thereon or an arrangement in the form of a stack with a grouping 10 of kegs with the largest keg diameter size set down on the pallet 2, on which a pallet 2 with a grouping 12 of kegs 4 with a medium keg diameter size is arranged and, above, a pallet 2 with a grouping 14 of kegs with a small keg diameter size.

Figure 2A:
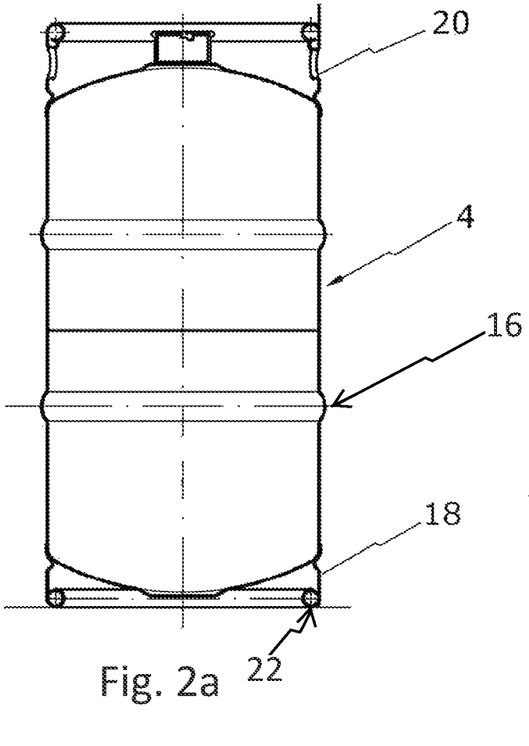
FIGS. 2a-2c show views of a keg (side views and plan view)
Figure 2B:
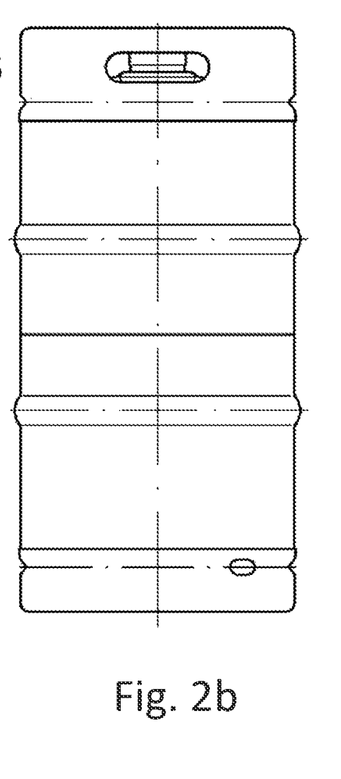
Figure 2C:
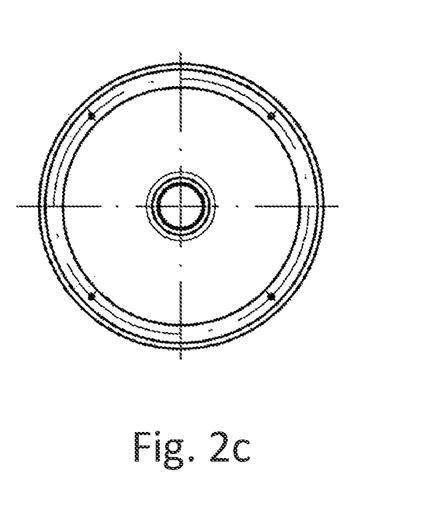

FIGS. 2a-2c serve merely to illustrate the kegs which are known per se, wherein FIG. 2 illustrates a keg with a holding capacity of 30 L, and in particular in two side views offset by 90° with respect to each other and a plan view of the keg from above. Such kegs 4 are cylindrical and can each have corrugations 16 depending on holding capacity, this not being significant to the invention since the kegs are more or less standardised, and ultimately the construction type used is dependent on the respective drinks manufacturer. In the conventional manner and as shown in FIG. 2, the kegs are extended upwards and downwards with respect to the holding area by cylindrical skirts in the form of annular flanges, wherein the free ends of the skirts are curved-in in rounded sections which form beads for stiffening purposes. Therefore the beads 22 form, as it were, the standing surface of the kegs, by means of which the load is transferred to the pallets.

The pallet described purely by way of example is in this case set down in order to hold four different keg sizes, wherein, in addition to the keg illustrated in FIG. 2 with a keg diameter of 278 mm and a keg height of 595 mm, within the system described herein purely by way of example further kegs with different dimensions can be used on the pallet in a suitable manner i.e. appropriately supported and placed. In the system described herein purely by way of example, these would be e.g. kegs with a holding capacity of ½ barrel (US-size) with a container diameter of 395 mm and an overall height of 590 mm, kegs with a holding capacity of 50 L with a keg diameter of 395 mm and a keg height of 590 mm, kegs with a holding capacity of ¼ barrel with a keg diameter of 278 mm and a keg height of 590 mm, kegs with a holding capacity of ⅙ barrel with—again purely by way of example—a keg diameter of 235 mm and a keg height of 590 mm and kegs with a holding capacity of 20 L with a keg diameter of 235 mm and a keg height of 570 mm.

For this system, described and illustrated purely by way of example, this means that kegs with three different keg diameter sizes, specifically 395, 278 and 235 mm must be able to be placed on a single pallet, and specifically for six kegs with different holding capacities of ⅙ barrel, ¼ barrel and ½ barrel and 20 L, 30 L and 50 L, wherein in the case of three keg diameter sizes, the holding capacity is ultimately determined by the different height of the kegs.

The height of the annular skirts which protrude upwards and downwards from the container is generally in the range of 2 to 3 cm and the bead thickness is set at 16, 18 or 22 mm according to the holding capacity of the keg.

It should be noted that the above-described keg sizes are conventional keg sizes but the invention is in no way limited to these keg sizes but rather, in order to describe the invention, for practical reasons kegs with specific dimensions are described and used purely by way of example.

Figure 3:
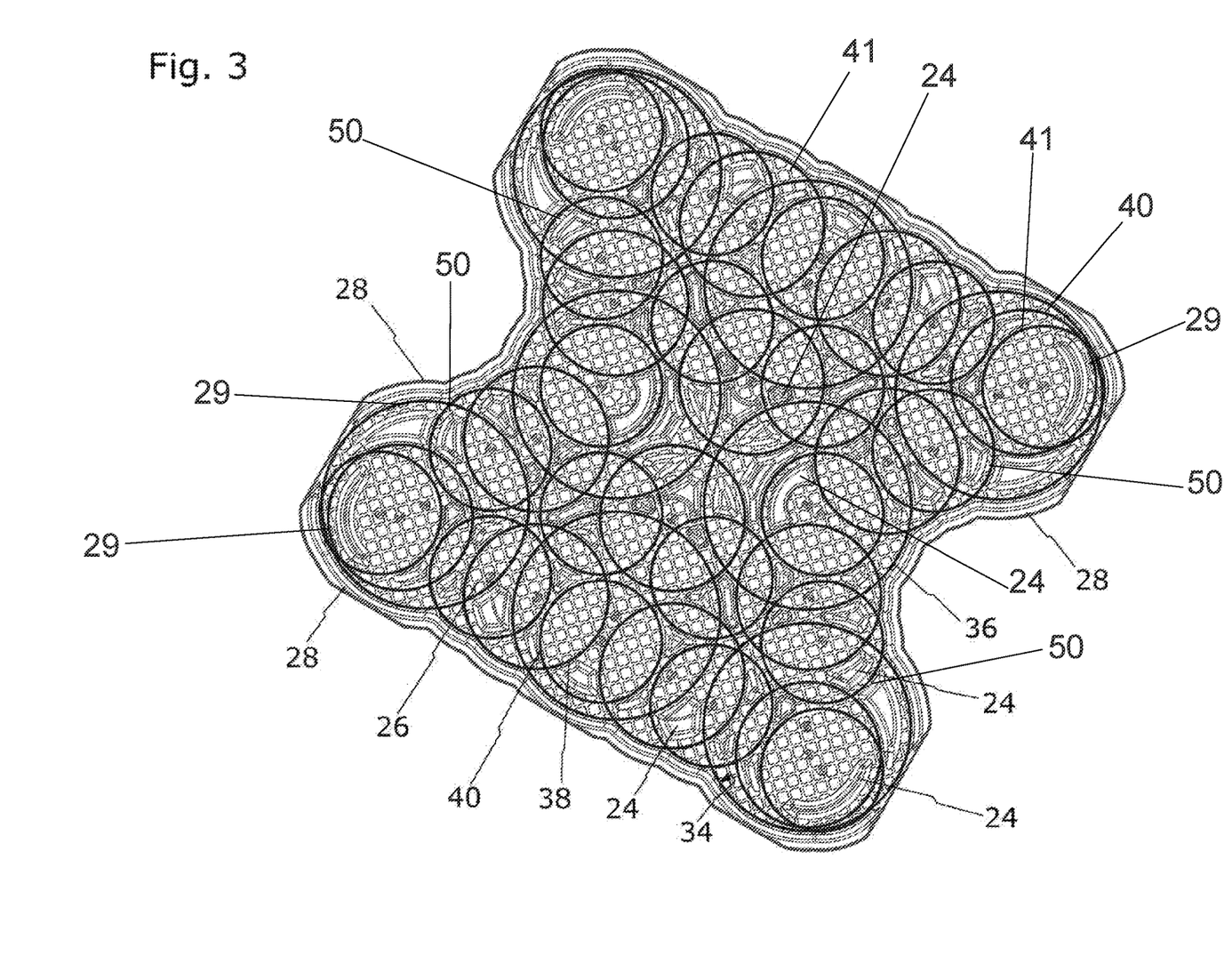
FIG. 3 shows a perspective view of an inventive embodiment of the pallet.

As is already clear form FIG. 1, the pallet is provided with supporting projections, which is particularly clear from FIG. 3. In this case, the pallet comprises first supporting projections 24 of different shapes, wherein all these projections 24 are formed protruding upwards on the support surface 26 of the pallet. These projections 24 of different form are in this case formed as stumps and expediently have closed walls in the upwards direction, i.e. at the tip. The height of these projections is between 1 cm to 6 cm, wherein preferred heights are in the range between 1.5 cm and 4 cm. However, the height of the projections is again not limited but can be selected as suitable.

Furthermore, second projections 28 are provided which are arranged on the peripheral edge of the pallet and in the form of flange-like webs and can have heights in the range stated above, and which may include an extension 29 of the edge-side second supporting projections. The first projections 24 lie within the second supporting projections 28 formed on the periphery, and specifically on the support surface which, as shown very clearly in FIG. 3, is expediently of an open structure, in particular is formed by a lattice 30.

Figure 4:
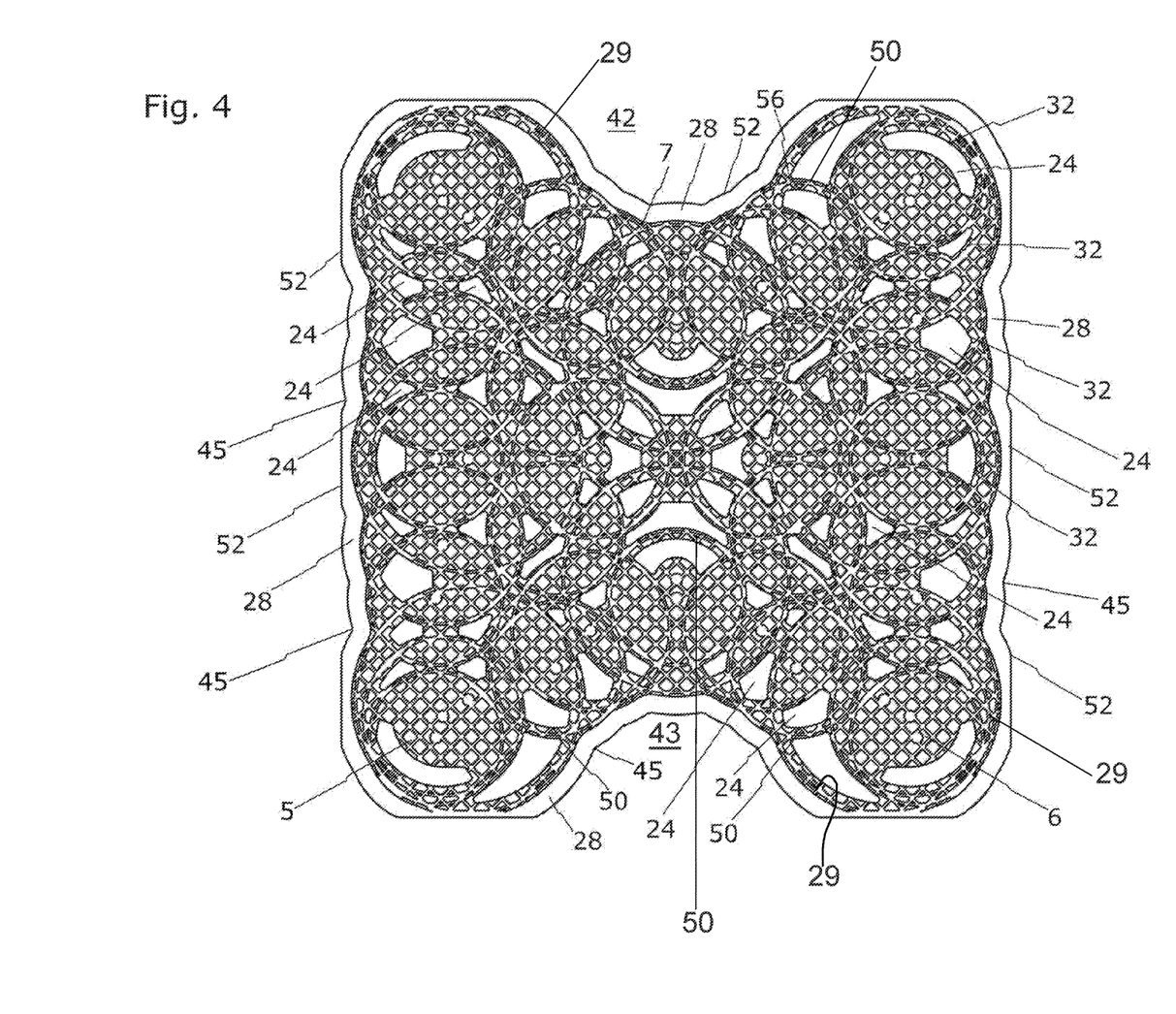
FIG. 4 shows a plan view of the pallet illustrated in FIG. 3.

These first and second projections are also clear from the plan view in FIG. 4, wherein reference signs designate only some of the first projections 24, this being imposed merely because of the large number of projections and for the sake of clarity.

As FIG. 4 very clearly shows, these projections 24 produce a very special pattern which at first glance appears entirely random but serves overall to ensure that kegs of different sizes, in the example specifically described herein kegs with three different keg diameters, can be appropriately held. In this case, as shown in FIG. 4, the side wall surfaces 32 of the first projections 24 are arcuate or formed in the manner of a rounded section, and in particular adapted to the different keg diameter sizes of the kegs to be held, in this case specifically three different keg diameter sizes.

As already stated in the introduction, the kegs have a specific footprint size formed by the skirts 18, 20 and the beads 22 formed thereon, when considering the kegs specifically illustrated in FIG. 2.

However, the pattern illustrated in FIG. 4, which appears very random at first sight, makes sense when considering FIG. 3 where the keg holders, each defined by the supporting projections 24, 28, each form standing surfaces for kegs with a different keg diameter. In detail, in this case, there are three different types of standing surfaces, which differ from each other in size, wherein the size is dictated by the dimensions of the standing surface of the kegs.

In detail, as shown in FIG. 3, the first and second supporting projections 24, 28 define standing surfaces 36 with a larger diameter, standing surfaces 38 with a medium keg diameter size and standing surfaces 40 with the smallest keg diameter size. At every location where the standing surfaces 36, 38, 40 of in each case the third grouping cross these first supporting projections 24, corresponding through-going slots 50 are provided in these first supporting projections 24 in the width of the standing surfaces 36, 38, 40.

These three different standing surface types or designs are illustrated in FIG. 3 by circles which are formed, in an advantageous embodiment, by annular webs which can also be formed as desired as ring sections but are expediently formed as continuous ring webs 41. In particular, these ring webs 41 are formed as one piece with the lattice 30 and serve to stiffen the support surface which must be able to hold not inconsiderable loads owing to the fully filled kegs set in place. In addition to this stiffening function, the ring webs 41 also serve as a marking which facilitates the placement of the kegs with different keg size diameters. In one expedient embodiment, this annular marking can also be presented in colour, i.e. in this case in three different colours such as red for the standing surfaces 36 with the largest diameter, blue for the standing surfaces 38 with the medium diameter and yellow for the standing surfaces 40 with the smallest keg diameter. This formation of the ring webs 41 is very clear from the plan view of a pallet 2 according to FIG. 4, wherein on the left the ring webs or standing surfaces for the different kegs are shown with the indication of holding capacity of 20 L, 30 L and 50 L. As is very clear from FIG. 4 but also from FIG. 3, the pallet 2 expediently, but not compulsorily, comprises a roughly H-shaped outline, wherein the longitudinal limbs of the H are determined by the two outermost rows 5 and 6 of keg holders with the largest keg diameter and the crosspiece of the H is determined by the middle row 7 of the keg holders for the kegs with the largest keg diameter size. In this case, this crosspiece of the H of the pallet 2, which is shorter in the longitudinal direction of the rows, is produced by two opposing indentations 42 and 43 which approximately follow the contour of the outer dimensions of the three rows of keg holders with the largest keg diameter, as especially shown particularly clearly in FIG. 1 for the lower pallet 2 with the placed kegs with the largest keg diameter. Further indentations 45 which are formed or dimensioned smaller are expediently formed on the peripheral edge in the spandrel-like regions between the edge-side circles evident from FIG. 3 or placement sites for the kegs.

As a result of the support function of the second projections 28, the flange webs forming the second projections 28 and protruding upwards above the support surface are also formed corresponding to the bulges 52 over the periphery of the pallet which are adapted to match the kegs of different keg diameter sizes to be held in the different rows, i.e. corresponding to the different standing surfaces 36 to 40.

The first and second projections and also the ring webs 41 are expediently formed as one piece with the pallet 2, wherein in particular the ring webs 41 forming the standing surface form an additional means of stiffening the lattice structure of the pallet 2. The lattice structure is expedient because in that case on the one hand a saving of plastic is made and on the other hand the necessary light-weight design along with the necessary sufficient level of stability can thereby be ensured. This embodiment is possible in particular owing to the load-bearing design of the annular standing surfaces.

The first and second projections are expediently formed as hollow profiles but, as already stated in the introduction, expediently have closed walls at the top, i.e. at the tip of the projections. This is also shown very clearly in FIG. 5a, left-hand illustration, which shows a perspective partial view of the pallet 2 from above.

Figure 5A:
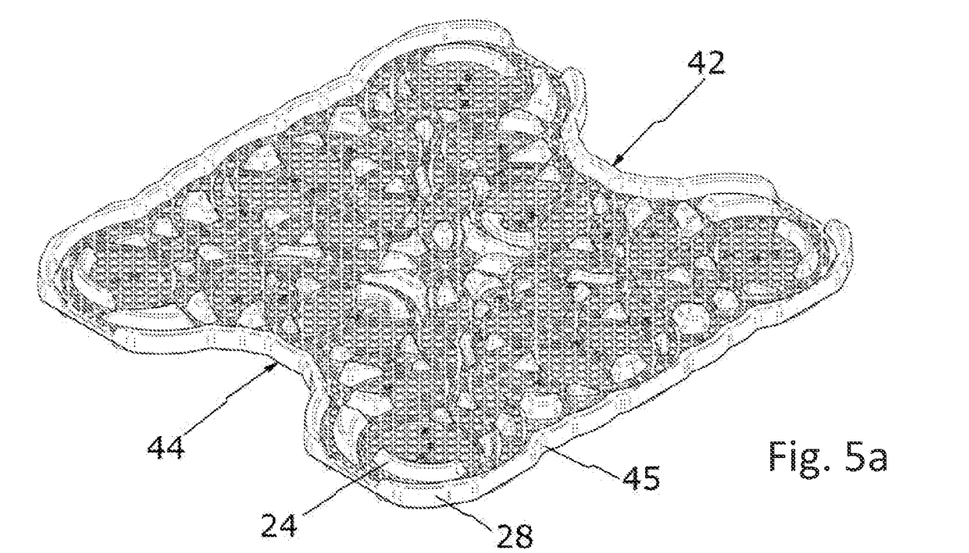
FIGS. 5a and 5b show a comparison of two pallets arranged next to one another, one in plan view (FIG. 5a) and one in a view from below (FIG. 5b), wherein it is to be noted that the illustrated embodiments are purely exemplary and are also illustrated in a purely schematic manner.
Figure 5B:
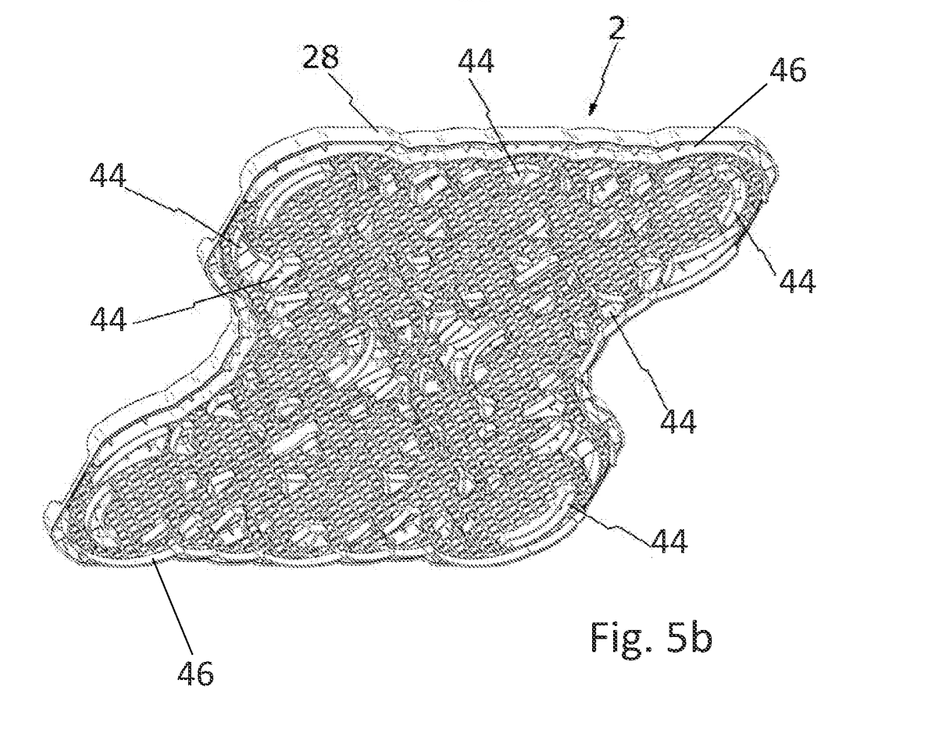

In an expedient development, on the underside of the pallet opposite the support surface with the projections 24, which is shown in a perspective view in in FIG. 5b, hollow profiles 44 are provided which are likewise expediently formed on the lattice. These hollow profiles 44, which are in particular open in the downwards direction, like the further hollow profiles 46 at the peripheral edge of the pallet are arranged at the positions which correspond to those of the projections 24 or 28 and advantageously also have a complementary shape. In this way, during transportation in the stack, there is extremely good interlocking of the kegs with the pallet lying below in the stack and lying above in the stack by means of the projections 24, 28 on the one hand and by means of the correspondingly positioned hollow profiles 44, 46 on the underside of each pallet on the other hand, whereby the placed kegs in the stack are correspondingly laterally supported and can be positioned both from underneath and also from above. FIG. 5 illustrates the pallet from above in a perspective plan view and from below in a view from the ground.

In addition, the design of the hollow profiles which are open in the downwards direction means that in the empty state the pallets 2 can be stacked one inside another in a space-saving manner since, in the stack, the first projections 24 can pass into the hollow profiles 44 and the second projections 28 can pass into the hollow profiles 46.

The invention claimed is:

1. A pallet configured to hold substantially cylindrical kegs having different keg diameter sizes, comprising:
a pallet support surface; and
a plurality of keg holders each comprising first and second supporting projections protruding upwardly from the pallet support surface and configured to support the kegs placed onto the support surface, the support projections arranged and configured on the support surface such that the kegs with different keg diameter sizes can be supported by the supporting projections, the plurality of keg holders arranged on the pallet such that the plurality of keg holders cooperate to form a plurality of groupings for the different keg diameter sizes in each case;
wherein the plurality of keg holders of the groupings with different keg diameter sizes form annular standing surfaces for the kegs having different keg diameters to be held, wherein the keg holders formed by the supporting projections, of a first grouping with a large keg diameter size of the groupings are aligned in three adjacent and mutually parallel rows, wherein a middle row of the three adjacent and mutually parallel rows comprises of the two keg holders and two outer rows each comprising three of the keg holders arranged one after the other, that the keg holders of a second grouping with a relative medium keg diameter size are aligned in four adjacent and mutually parallel rows each comprise four of the keg holders arranged one after the other, and that the keg holders of a third grouping with a relatively small keg diameter size can be supported in five adjacent and mutually parallel rows in which a middle row of the five adjacent and mutually parallel rows comprises two of the keg holders arranged one after the other, two rows adjacent thereto each comprise four of the keg holders arranged one after the other, and two outermost rows of the five adjacent and mutually parallel rows each comprise five of the keg holders arranged one after the other;
wherein said first supporting projections of the supporting projections arranged on the support surface are each arranged in a region on the support surface which is defined by the annular standing surfaces of the plurality of keg holders of in each case two of three groupings, and wherein continuous slots with corresponding standing surface widths of the kegs are provided in the first supporting projections at the points at which the standing surfaces of said third grouping in each case cross the first supporting projections.

2. The pallet as claimed in claim 1, wherein the supporting projections are arranged and configured such that kegs in three different keg diameter sizes can be supported on the support surface.

3. The pallet as claimed in claim 1, wherein the supporting projections form the plurality of keg holders configured for the placement of kegs with three keg diameter sizes on a single pallet.

4. The pallet as claimed in claim 1, wherein the supporting projections are formed by first stump supporting projections on the support surface and by second flange supporting projections arranged on an outer periphery.

5. The pallet as claimed in claim 1, wherein the first projections for the keg holder taper in an upward direction and are configured as hollow profiles closed at the top.

6. The pallet as claimed in claim 1, wherein the support surface comprises an open structure formed by a lattice structure.

7. The pallet as claimed in claim 6, wherein the plurality of keg holders for the plurality of groupings with different keg diameter sizes are formed by annular standing surfaces integrated in the lattice structure of the support surface, wherein the standing surfaces comprise ring webs each with a diameter corresponding to the keg diameter size or annular portions corresponding to the standing surface of the kegs.

8. The pallet of claim 7, wherein the ring webs are formed as one piece with the lattice structure.

9. The pallet as claimed in claim 1, wherein the keg holder includes between two and five of the first supporting projections.

10. The pallet as claimed in claim 4, wherein the first supporting projections and second supporting projections comprise arcuate side walls adapted to the standing surfaces of the keg holders, and wherein the slots provided in the first projections comprise an arcuate shape adapted to the standing surfaces of the third grouping.

11. The pallet as claimed in claim 1, wherein the first supporting projections are arranged inside and/or outside corresponding standing surfaces of the pallet such that kegs placed therein can be supported from inside and/or outside.

12. The pallet as claimed in claim 3, wherein four corners of the pallet are adapted to the rounding of the standing surfaces of the grouping with the largest keg holder diameter.

13. The pallet as claimed in claim 10, wherein an extension of the edge-side second supporting projections are adapted to an extension of the respective adjacent standing surface of the keg holders with a large and a medium keg holder diameter.

14. The pallet as claimed in claim 1, wherein the pallet, on a lower pallet surface opposite the support surface, at positions corresponding to the supporting projections, comprises downwardly open hollow profiles for engagement of supporting projections lying below in a stack of a plurality of the pallets.

15. The pallet as claimed in claim 14, wherein the downwardly open hollow profiles are formed in a complementary manner to the supporting projections and form complementary lower keg holders corresponding to the first and second supporting projections, such that kegs are also supported from above by the pallet.

16. The pallet as claimed claim 1, wherein a height of the first supporting projections and second supporting projections are in a range of 15 mm to 35 mm.

17. The pallet as claimed in claim 16, wherein the height of the first supporting projections and second supporting projections are in a range of 20 mm to 30 mm.

18. A pallet configured to hold substantially cylindrical kegs having different keg diameter sizes, comprising:
a pallet support surface; and
a plurality of keg holders each comprising supporting projections protruding upwardly from the pallet support surface and configured to support the kegs placed onto the support surface, the support projections arranged and configured on the support surface such that the kegs with different keg diameter sizes can be supported by the supporting projections, the plurality of the keg holders arranged on the pallet such that the plurality of keg holders cooperate to form a plurality of groupings for the different keg diameter sizes in each case;
wherein the plurality of keg holders of the groupings with different keg diameter sizes form annular standing surfaces for the kegs having different keg diameters to be held, wherein first supporting projections of the supporting projections arranged on the support surface are each arranged in a region on the support surface which is defined by the annular standing surfaces of the plurality of keg holders of in each case two of the three groupings, and wherein in plan view, the pallet is substantially H-shaped, wherein two longitudinal limbs of the pallet are formed by the two outermost rows of the grouping with the largest keg diameter size and a crosspiece of the pallet is formed by the middle row of the grouping having the largest keg diameter size, whereby two oppositely arranged indentations of the pallet are formed in the region of the crosspiece of the pallet.

19. The pallet as claimed in claim 18, wherein continuous slots with corresponding standing surface widths of the kegs are provided in the first supporting projections at the points at which the standing surfaces of a third grouping in each case cross the first supporting projections, which is formed by a subset of the plurality of keg holders having relative smallest keg diameter sizes.

* * * * *

UNITED STATES PATENT AND TRADEMARK OFFICE
CERTIFICATE OF CORRECTION

PATENT NO. : 11,485,541 B2
APPLICATION NO. : 16/630333
DATED : November 1, 2022
INVENTOR(S) : Swartz et al.

It is certified that error appears in the above-identified patent and that said Letters Patent is hereby corrected as shown below:

In the Specification

Column 4, Line 15:
After "pallet" insert -- . --

Column 5, Line 18:
Delete "hollow" (2nd occurrence)

Column 5, Line 28:
"drawing" (2x) should be – drawings –

Column 7, Line 1:
"Land" should be – L and –

Column 7, Line 13:
"form" should be – from –

In the Claims

Column 9, Claim 1, Line 52:
After "rows" insert -- in which two middle rows of the four adjacent and mutually parallel rows each comprise three of the keg holders and two outer rows of the four adjacent and mutually parallel rows --

Column 10, Claim 13, Line 52:
"are" should be – is –

Column 11, Claim 16, Line 3:
"are" should be – is –

Signed and Sealed this
Fourteenth Day of March, 2023

Katherine Kelly Vidal
*Director of the United States Patent and Trademark Office*

CERTIFICATE OF CORRECTION (continued)
U.S. Pat. No. 11,485,541 B2

Column 11, Claim 17, Line 6:
"are" should be – is –

Column 12, Claim 18, Line 8 (2nd occurrence):
Before "two" delete "the"

Column 12, Claim 18, Line 10 (2nd occurrence):
After "by" delete "the" and insert -- a --